United States Patent
Fox et al.

(10) Patent No.: US 8,695,456 B2
(45) Date of Patent: Apr. 15, 2014

(54) ELECTRONICALLY TRIGGERED LOCKING DIFFERENTIAL

(75) Inventors: Matthew G. Fox, Ceresco, MI (US);
Keith E. Morgensai, Marshall, MI (US);
Andrew N. Edler, Homer, MI (US);
Patrick J. McMillan, Battle Creek, MI (US)

(73) Assignee: Eaton Corporation, Cleveland, OH (US)

( * ) Notice: Subject to any disclaimer, the term of this patent is extended or adjusted under 35 U.S.C. 154(b) by 61 days.

(21) Appl. No.: 13/283,057

(22) Filed: Oct. 27, 2011

(65) Prior Publication Data

US 2012/0180596 A1   Jul. 19, 2012

Related U.S. Application Data

(60) Provisional application No. 61/409,696, filed on Nov. 3, 2010.

(51) Int. Cl.
*F16H 48/20* (2012.01)

(52) U.S. Cl.
USPC .......................... 74/665 H; 475/231; 475/249

(58) Field of Classification Search
USPC ...................... 74/665 F, 665 H; 475/231, 249
See application file for complete search history.

(56) References Cited

U.S. PATENT DOCUMENTS

| | | | |
|---|---|---|---|
| 3,878,414 A | 4/1975 | Harakawa | |
| 4,838,118 A | 6/1989 | Binkley | |
| 5,036,940 A * | 8/1991 | Takemura | 180/249 |
| 5,651,749 A | 7/1997 | Wilson et al. | |
| 5,989,147 A | 11/1999 | Forrest et al. | |
| 6,062,330 A * | 5/2000 | Watson et al. | 180/248 |
| 6,551,209 B2 | 4/2003 | Cheadle et al. | |
| 6,796,412 B2 | 9/2004 | Teraoka | |
| 6,997,294 B2 | 2/2006 | Ochiai et al. | |
| 7,201,696 B2 | 4/2007 | DeGowske | |
| 7,247,118 B2 | 7/2007 | Haruki et al. | |

(Continued)

FOREIGN PATENT DOCUMENTS

| | | |
|---|---|---|
| JP | 1022633 | 1/1989 |
| JP | 8025995 | 1/1996 |

OTHER PUBLICATIONS

International Search Report issued in corresponding International (PCT) Patent Application No. PCT/US2011/058233 (Mar. 7, 2012).

(Continued)

*Primary Examiner* — Ha D Ho
(74) *Attorney, Agent, or Firm* — Dykema Gossett PLLC

(57) ABSTRACT

An electronically triggered locking differential includes a differential case, at least one pinion gear and a pair of side gears. A clutch pack is disposed between one of the side gears and the differential case and retards relative rotation between the differential case and the side gear. A cam member is disposed adjacent the clutch pack so that the clutch pack engages when the cam member ramps up. An engagement shaft has one end engaged with the cam member and an opposite end extending through the differential case and engaged with a sprocket. A magnetic coil and flux conductor magnetically couple the sprocket to the differential case when the coil is energized. This coupling retards rotation of the engagement shaft and the cam member relative to the gear case, initiating engagement of the clutch pack to lock the differential.

18 Claims, 3 Drawing Sheets

(56) References Cited

U.S. PATENT DOCUMENTS

| | | | |
|---|---|---|---|
| 7,325,664 B2 * | 2/2008 | Fusegi | 192/84.92 |
| 7,354,374 B2 * | 4/2008 | Teraoka | 475/231 |
| 7,357,749 B2 | 4/2008 | Nofzinger et al. | |
| 7,361,116 B2 | 4/2008 | Kyle et al. | |
| 7,399,248 B2 | 7/2008 | Kleinhans et al. | |
| 7,491,146 B2 * | 2/2009 | Sharma et al. | 475/221 |
| 7,846,056 B2 * | 12/2010 | Chludek et al. | 475/231 |
| 2004/0056748 A1 | 3/2004 | Masaki et al. | |
| 2009/0258749 A1 | 10/2009 | Mochihara | |
| 2012/0180596 A1 | 7/2012 | Fox et al. | |

OTHER PUBLICATIONS

Written Opinion issued in corresponding International (PCT) Patent Application No. PCT/US2011/058233 (Mar. 7, 2012).

* cited by examiner

ELECTRONICALLY TRIGGERED LOCKING DIFFERENTIAL

CROSS-REFERENCE TO RELATED APPLICATIONS

This application claims the benefit of U.S. provisional application Ser. No. 61/409,696 filed Nov. 3, 2010 entitled ELECTRONICALLY TRIGGERED LOCKING DIFFERENTIAL, the entire disclosure of which is hereby incorporated by reference herein.

TECHNICAL FIELD

The present teachings relate to vehicle differentials and more particularly to electronically triggered locking differentials that respond at least in part based on an input signal.

BACKGROUND

Locking differentials typically include a gear case defining a gear chamber, and disposed therein, a differential gear set including at least one input pinion gear, and a pair of output side gears. A clutch pack can be disposed between at least one of the side gears and an adjacent surface of the gear case so that the clutch pack can prevent relative rotation between the gear case and the one side gear. Clutch packs are preferable to dog clutches because clutch packs tend to absorb energy more effectively and have a higher engagement speed and smoother engagement action while protecting the differential and driveline components from high impact loading. Cam members may be disposed between the clutch pack and an adjacent side gear to engage the clutch pack upon relative rotation of the cam members. In one type of locking differential, the cam member ramps in response to engage the clutch pack, thus locking the side gear relative to the differential gear case.

Many differential systems have an actuating mechanism to move the clutch pack to its engaged condition. Conventional systems engage the clutch pack in response to a sensed predetermined speed differential between wheels. Alternative systems may include an actuator that engages the clutch packs in response to an electrical signal instead of a sensed speed difference. Some possible actuators include piston-cylinder actuators or electromagnetic systems that require multiple coils within the differential case. These systems are complex and increase the total number of parts in the differential.

Mechanical locking differentials are still often used in vehicles, but there are sometimes concerns regarding the compatibility between such differentials and anti-lock braking systems or electronic stability control systems. However, replacing the mechanical locking differential with a currently-known electronically triggered differential design would be unduly complicated and potentially cost-prohibitive.

There is a desire for an electronically triggered locking differential with a simple, cost-effective design. There is also a desire for an electronically triggered locking differential that can be easily adapted to currently-known mechanical locking differentials to simply conversion to an electronically triggered differential.

SUMMARY

An electronically triggered vehicle differential can comprise a differential case defining an axis of rotation and a gear chamber. The gear chamber can house at least one pinion gear acting as an input gear and first and second side gears acting as output gears, wherein at least one of the first and second side gears as a first cam surface. The differential also may include a clutch pack operable between an engaged condition to retard rotation between the differential case and the first and second side gears and a disengaged condition, and a cam member having a second cam surface. The cam member can be axially movable in response to a relative rotation between the first and second cam surfaces to engage the clutch pack. The differential also comprises an engagement shaft having a first end engaged with the cam member and a second end that extends through the differential case. A spur gear can be disposed on the second end, and rotation of at least one of said first and second side gears relative to the differential case causes rotation of the engagement shaft along a shaft axis.

To provide electronic triggering capability, the differential can include a magnetic coil operable between a de-energized condition and an energized condition where the magnetic coil generates magnetic flux, a bearing race supporting the magnetic coil, a flux conductor disposed on the differential case, and a sprocket coupled to the spur gear and disposed between the differential case and the flux collector. The sprocket can rotate about the axis of rotation of the differential case. When the magnetic coil is in the energized condition, magnetic drag can slow rotation of the sprocket relative to the differential case and thereby retards rotation of the engagement shaft about the shaft axis. Retarding rotation of the engagement shaft can retard rotation of the cam member relative to the side gear, causing the first and second cam surfaces to rotate relative to each other, resulting in axial movement of the cam member to engage the clutch pack and lock the differential.

DETAILED DESCRIPTION

Figure 1:
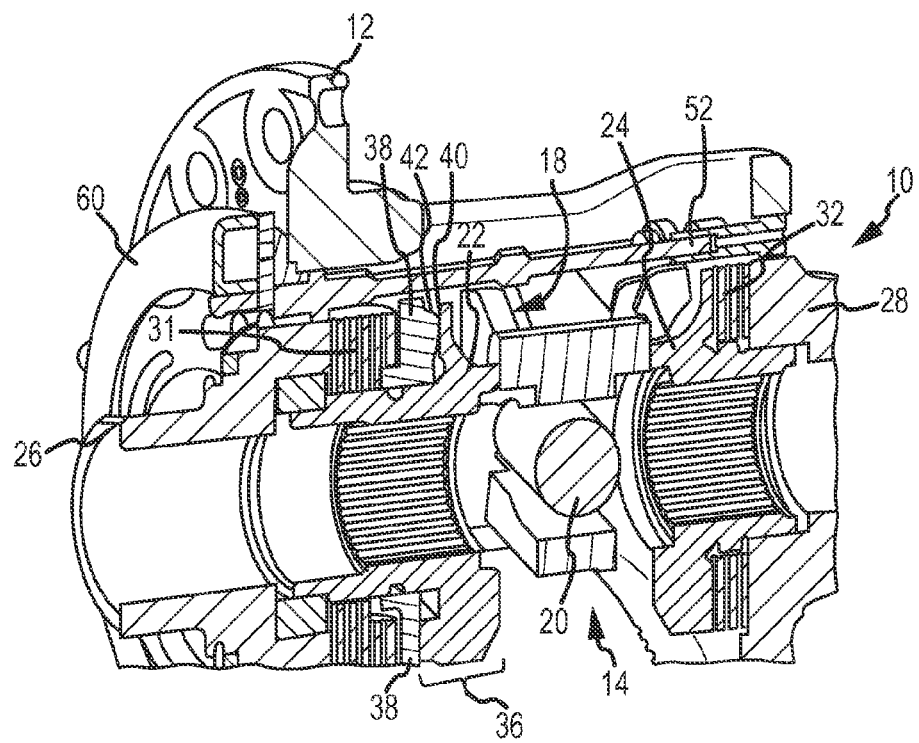
FIG. 1 is an axial cross-sectional representative view of a locking differential according to one aspect of the present teachings.
Figure 2:
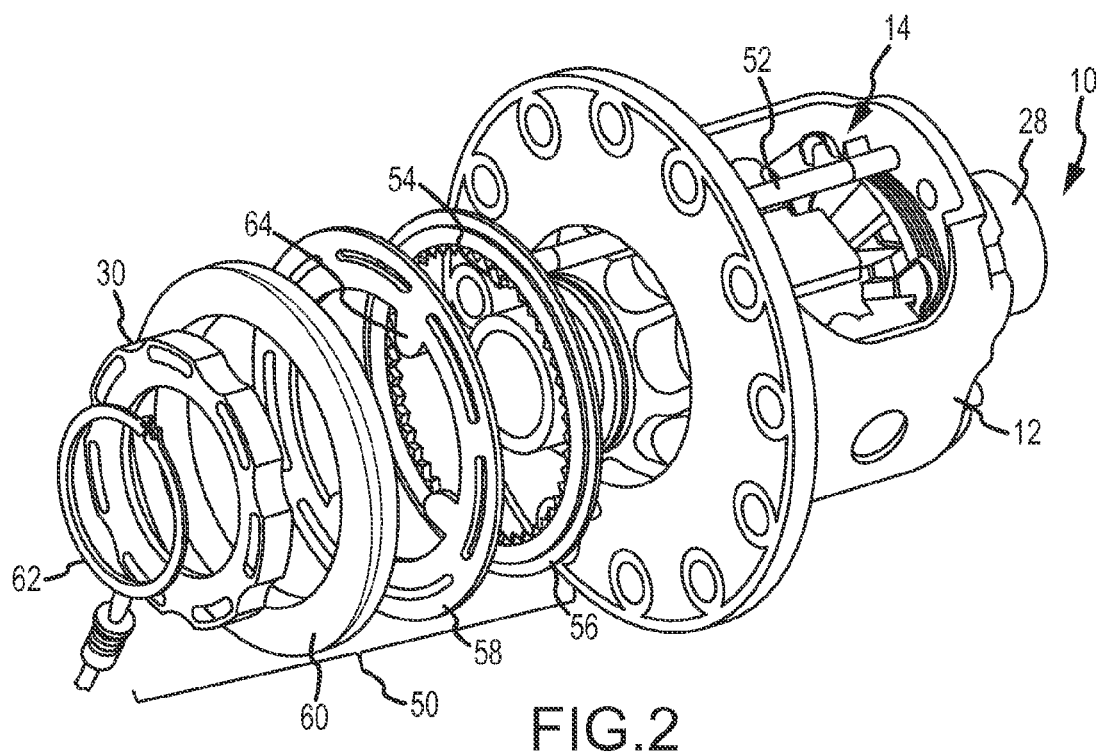
FIG. 2 is an exploded view of the locking differential in FIG. 1.
Figure 3:
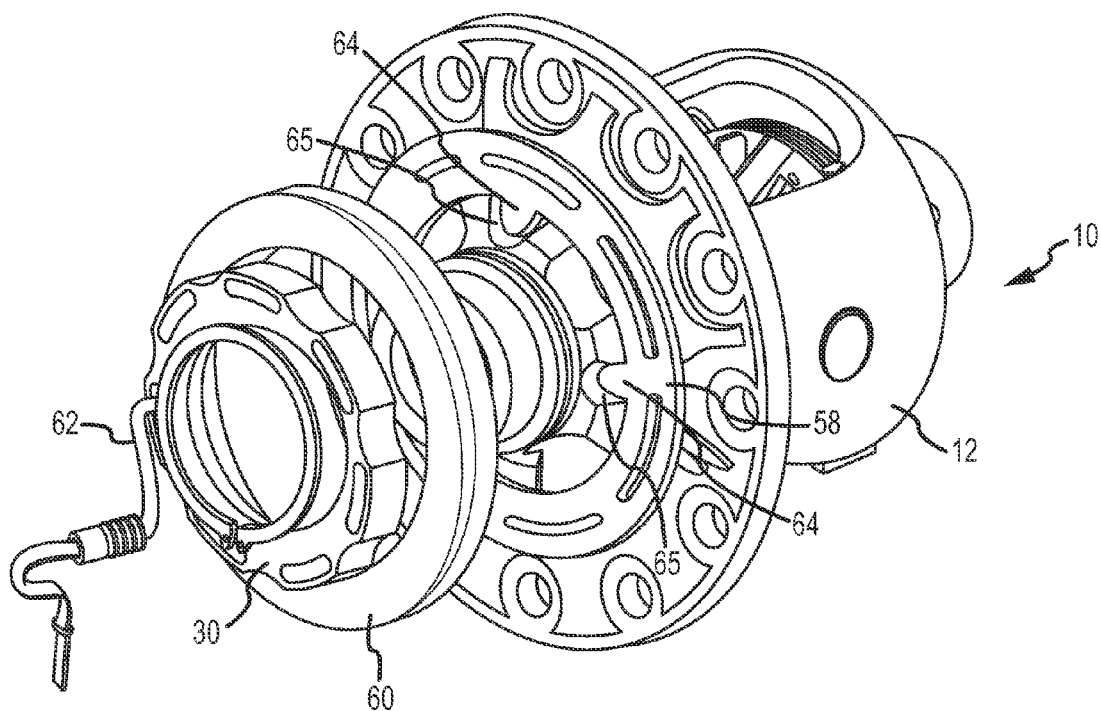
FIG. 3 is an axial view of the locking differential in FIG. 1 illustrating an engagement between components in the differential.

Referring now to the drawings, which are not intended to limit any aspect of the present teachings, FIG. 1 is an axial cross-section of an electronically-triggered locking differential 10 according to one aspect of the present teachings. The differential 10 includes a differential case 12 that defines therein a gear chamber 14.

A differential gear set within the differential case 12 can include a plurality of pinions 18 mounted on a pinion shaft 20. The pinion shaft 20 itself can be secured to the differential case 12 via any appropriate means. The pinions 18 act as the input gears of the differential 10, and are in meshing engagement with a pair of side gears 22 and 24, which act as the output gears in the differential 10.

The differential case 12 may include annular hub portions 26 and 28. A bearing race 30 can be mounted on at least one of the hub portions 26, 28 to provide rotational support for the differential components relative to an outer housing (not shown).

During normal, straight-ahead operation of the vehicle, no differentiation occurs between the left and right axle shafts (not shown) connected to the differential 10. Thus, the pinions 18 do not rotate relative to the pinion shaft 20. The differential case 12, the pinions 18, the side gears 22 and 24, and the axle shafts all rotate about the axis of rotation of the axle shafts as a solid unit.

Under certain vehicle operating conditions, such as when the vehicle is turning, the differential 10 allows a certain amount of differentiation between the rotational speeds of the side gears 22, 24. However, when the speed differential between the side gears 22, 24 rises above a certain, predetermined level, it can be desirable to slow the relative rotation between the differential case 12 and the side gears 22, 24 to prevent excessive differentiation. There can also be operating conditions wherein it is desirable to lock the differential 10 altogether and prevent any differentiating action, even before it has a chance to occur.

A locking mechanism that locks the differential 10 can include a first clutch pack 31 having a plurality of clutch discs splined to the differential case 12 and a second clutch pack 32 splined to the side gears 22, 24. The locking mechanism can further include a cam assembly 36 to move the clutch packs 31, 32 from a disengaged position to an engaged position. When the clutch packs 31, 32 are engaged, they can slow or stop relative rotation between the differential case 12 and the side gears 22, 24.

The cam assembly 36 can include the side gear 22 and a cam member 38. The side gear 22 may define a first cam surface 40, and the cam member 38 defines a second cam surface 42. The cam member 38 can also define a set of external splines (not shown). During normal, straight-ahead operation of the vehicle, with little or no differentiation occurring, the cam surfaces 40, 42 remain in a neutral position and the cam member 38 rotates with the side gear 22 at the same rotational speed. To engage the clutch pack 31, the rotational speed of the cam member 38 can be slowed relative to the rotational speed of the side gear 22, which causes ramping of the cam surfaces 40, 42. This ramping results in axial movement of the cam member 38, resulting in engagement of the clutch pack 31.

The differential 10 can use an electronically-triggered actuation mechanism 50 as shown in the Figures to slow rotation of the cam member 38. The actuation mechanism 50 can include an engagement shaft 52. A spur gear 54 can be disposed on at least one end of the engagement shaft 52. The spur gear 54 can have a plurality of external splines and can be disposed outside the differential case 12. A sprocket 56 can be also disposed outside the differential case 12 and has a plurality of internal splines that engage with the spur gear 54. Although the sprocket 56 is shown with splines on its inner diameter, the sprocket 56 can have splines on its outer diameter without departing from the scope of the illustrating aspects of the present teachings.

It will be understood by those skilled in the art in light of the disclosure that the use of the term "splines" herein can include gear teeth or various other elements that transmit sufficient retarding torque from the engagement shaft 52 to the cam member 38. The engagement shaft 52 rotates when there is a wheel speed differential, and the differential 10 locks whenever a torque is applied to the engagement shaft 52 relative to the rotation of the differential case 12.

The electronic portion of the actuation mechanism 50 can include a flux conductor 58 and a magnetic coil 60. A connector 62 may connect the magnetic coil 60 to a current source (not shown) so that the magnetic coil 60 can be selectively energized and de-energized in response to an electrical signal. The bearing race 30 and sprocket 56 can be made of a magnetic material so that they can be magnetically coupled to the differential case 12 through the flux conductor 58.

The flux conductor 58 can have a plurality of ears 64 disposed on its inner circumference to engage with corresponding notches 65 on the differential case 12. The magnetic coil 60 and the bearing race 30 are disposed on the differential case 12 on top of the flux conductor 58.

When the differential 10 is differentiating (i.e., when the coil 60 is de-energized and the pinions 18 and side gears 22, 24 are spinning inside the differential case 12), the side gears 22, 24 and the differential case 12 spin at different speeds. In this state, the cam member 38 rotates at the same speed as the side gears 22, 24.

To initiate a locking operation, the coil 60 is energized. Energizing the coil 60 can create a magnetic coupling between the sprocket 56 and the flux conductor 58. This magnetic coupling also can couple the sprocket 56 to the differential case 12. Since the engagement shaft 52 rotates during the wheel speed differential, coupling the sprocket 56 to the differential case 12 retards the rotational speed of the sprocket 56, thereby applying a torque to the engagement shaft 52. Also, energizing the coil 60 can create a drag force as the cam member 38 tries to match the speed of the differential case 12 while the side gears 22, 24 spin at their own speed. In turn, as noted above, the torque on the engagement shaft 52 relative to the rotation of the differential case 12 and the speed differential between the side gear 22 and the cam member 38 can cause the cam surfaces 40, 42 to ramp. The ramping action can cause axial movement of the cam member 38 and engagement of the clutch pack 31 to lock the differential 10.

Figure 4:
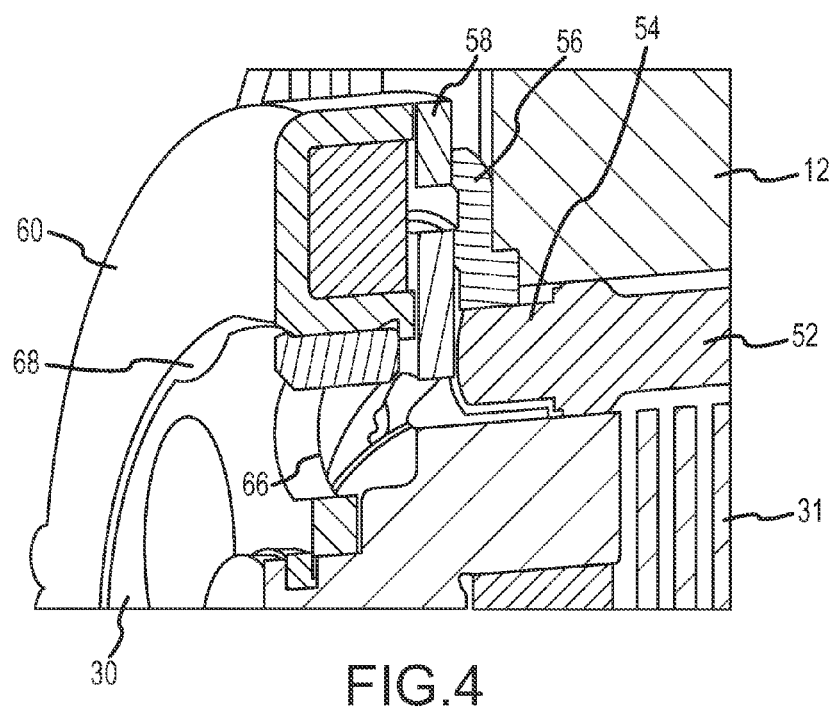
FIG. 4 is a close-up view of a portion of the locking differential to show a magnetic air gap.
Figure 5:
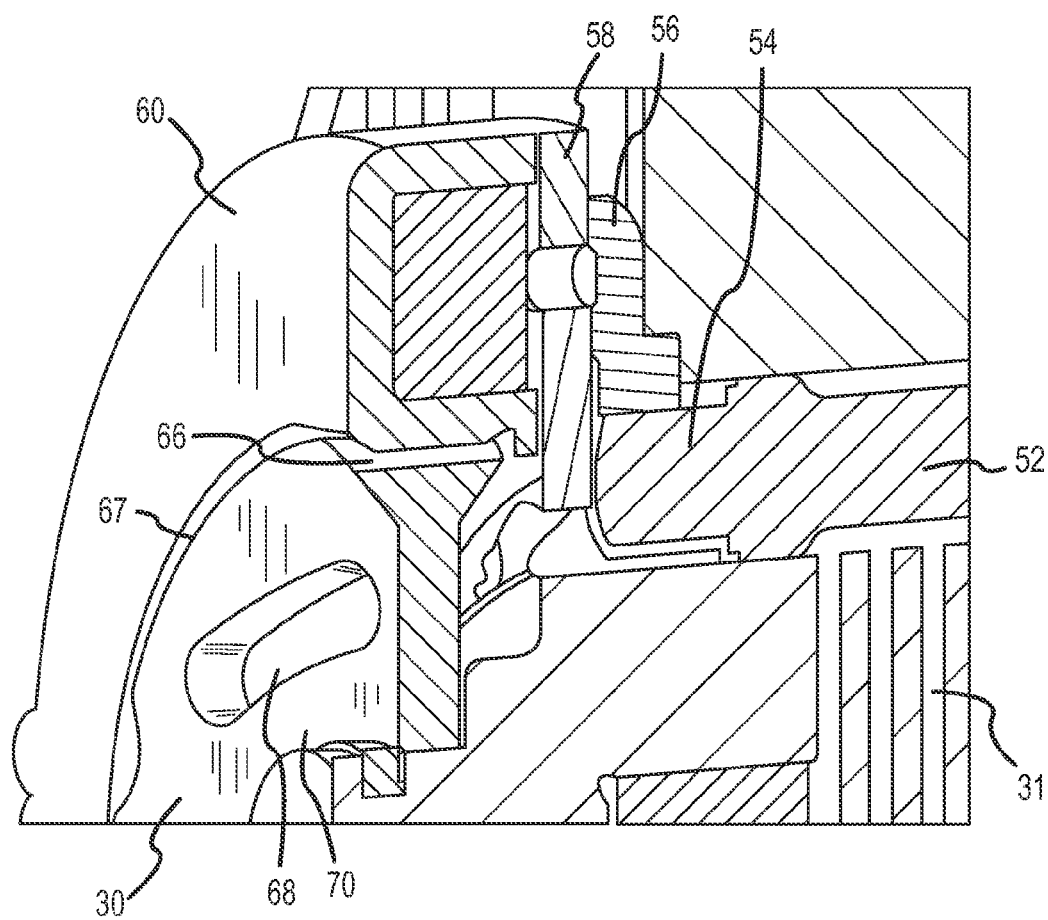
FIG. 5 is a close-up view of the portion in FIG. 4 to show a different magnetic air gap.

FIGS. 4 and 5 illustrate examples of possible details that may be incorporated in the differential 10 to improve performance. As noted above, the bearing race 30 can be made of a magnetic material and configured to concentrate the magnetic field in the magnetic coil 60, flux conductor 58, and bearing race 30 where it can be used efficiently and to reduce magnetic field loss into the differential case 12 or surrounding material. FIG. 4 illustrates one aspect of the system with a series of first air gaps 66 disposed in the pilot journal 67 of the bearing race 30 (i.e., the surface of the bearing race 30 that touches or pilots the inner diameter of the coil 60) and arranged concentrically with the magnetic coil 60. FIG. 5 illustrates a series of second air gaps 68 disposed in vertical supporting features 70 of the bearing race 30. In one aspect, the first and second air gaps 66, 68 can be formed as alternating scallops 66 and pockets 68. This bearing race 30 structure can trap the magnetic field generated by the magnetic coil 60 and focuses the field where it can be used for locking the differential 10. More particularly, the first and second air gaps 66, 68 can create a path of greater resistance for the flux to focus the flux into the sprocket 56 and flux conductor 58. Thus, the first and second air gaps 66, 68 can restrict the flux from short-circuiting into the differential case 12.

As noted above, the engagement shaft 52 can rotate when there is a wheel speed differential. Rotation of the engagement shaft 52 causes rotation of the sprocket 56 via the spur gear 54. To initiate a locking operation, current can be sent through the connector 62 to energize the magnetic coil 60 and generate a magnetic field. The resulting magnetic flux flows from the coil 60 through the flux conductor 58, through the sprocket 56, and back to the coil 60. This can create a magnetic coupling between the sprocket 56, the flux conductor 58, and the differential case 12, causing the sprocket 56 to rotate with the differential case 12.

The magnetic drag between the sprocket 56 and the flux conductor 58 can slow the rotation of the sprocket 56 and applies a torque on the spur gear 54 and engagement shaft 52, thereby slowing rotation of the engagement shaft 52 relative to the differential case 52. This in turn retards rotation of the cam member 38 relative to the side gear 22, causing the cam surfaces 40, 42 to ramp and the clutch pack 30 to engage, locking the differential.

As a result, the present teachings can provide electrical actuation capability to a normally used in mechanical locking differentials. For example, as explained above, a system according to an aspect of the present teachings incorporates an existing clutch pack, spur gear, and engagement shaft. This creates an electronically triggered locking differential that is easily compatible with existing differential systems and provide a low-cost conversion from a mechanical system to an electrical one.

It will be appreciated that the above teachings are merely exemplary in nature and is not intended to limit the present teachings, their application or uses. While specific examples have been described in the specification and illustrated in the drawings, it will be understood by those of ordinary skill in the art that various changes may be made and equivalents may be substituted for elements thereof without departing from the scope of the present teachings as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present teachings not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. An electronically triggered vehicle differential comprising:
    a differential case defining an axis of rotation and a gear chamber;
    at least one pinion gear acting as an input gear and first and second side gears acting as output gears, the pinion gear and first and second side gears disposed in the gear chamber, wherein at least one of the first and second side gears has a first cam surface;
    a clutch pack operable between an engaged condition to retard rotation between the differential case and the first and second side gears and a disengaged condition;
    a cam member having a second cam surface, wherein the cam member is axially movable in response to a relative rotation between the first and second cam surfaces to engage the clutch pack;
    an engagement shaft having a first end engaged with the cam member and a second end that extends through the differential case, wherein a spur gear is disposed on the second end, and wherein rotation of at least one of said first and second side gears relative to the differential case causes rotation of the engagement shaft along a shaft axis;
    a magnetic coil operable between a de-energized condition and an energized condition, wherein the magnetic coil generates magnetic flux when in the energized condition;
    a bearing race supporting the magnetic coil;
    a flux conductor disposed on the differential case;
    a sprocket coupled to the spur gear and disposed between the differential case and the flux collector, wherein the sprocket rotates about the axis of rotation of the differential case, wherein when the magnetic coil is in the energized condition, magnetic drag slows rotation of the sprocket relative to the differential case and thereby retards rotation of the engagement shaft about the shaft axis,
    wherein retarding rotation of the engagement shaft retards rotation of the cam member relative to the side gear, causing the first and second cam surfaces to rotate relative to each other, resulting in axial movement of the cam member to engage the clutch pack and lock the differential.

2. The electronically triggered locking differential of claim 1, wherein the magnetic coil operates between the energized and de-energized condition based on an external electrical signal.

3. The electronically triggered locking differential of claim 1, wherein the sprocket is made of a magnetic material and wherein the magnetic drag occurs between the sprocket and the flux conductor.

4. The electronically triggered locking differential of claim 1, wherein the bearing race is made of a magnetic material.

5. The electronically triggered locking differential of claim 4, wherein the bearing race has a pilot journal and a plurality of vertical supporting features, and wherein the bearing race has a plurality of air gaps.

6. The electronically triggered locking differential of claim 5, wherein said plurality of air gaps comprises first air gaps disposed in the pilot journal and second air gaps disposed in the vertical supporting features, wherein the first and second air gaps alternate with each other.

7. An electronically triggered locking differential comprising:
    a differential case defining an axis of rotation and a gear chamber;
    at least one pinion gear acting as an input gear and first and second side gears acting as output gears, the pinion gear and first and second side gears disposed in the gear chamber, wherein at least one of the first and second side gears has a first cam surface;
    a clutch pack operable between an engaged condition to retard rotation between the differential case and the first and second side gears and a disengaged condition;
    a cam member having a second cam surface, wherein the cam member is axially movable in response to a relative rotation between the first and second cam surfaces to engage the clutch pack;
    an engagement shaft having a first end directly engaged with the cam member and a second end that extends through the differential case, wherein a spur gear is disposed on the second end, and wherein rotation of at least one of said first and second side gears relative to the differential case causes rotation of the engagement shaft along a shaft axis;
    a magnetic coil operable between a de-energized condition and an energized condition, wherein the magnetic coil generates magnetic flux when in the energized condition;
    a bearing race supporting the magnetic coil;
    a flux conductor disposed on the differential case;
    a sprocket coupled to the spur gear and disposed between the differential case and the flux collector, wherein the sprocket rotates about the axis of rotation of the differential case, wherein when the magnetic coil is in the energized condition, magnetic drag slows rotation of the sprocket relative to the differential case and thereby retards rotation of the engagement shaft about the shaft axis, wherein retarding rotation of the engagement shaft retards rotation of the cam member relative to the side gear, causing the first and second cam surfaces to rotate relative to each other, resulting in axial movement of the cam member to engage the clutch pack and lock the differential.

8. The electronically triggered locking differential of claim 7, wherein the magnetic coil operates between the energized and de-energized condition based on an external electrical signal.

9. The electronically triggered locking differential of claim 7, wherein the sprocket is made of a magnetic material and wherein the magnetic drag occurs between the sprocket and the flux conductor.

10. The electronically triggered locking differential of claim 7, wherein the bearing race is made of a magnetic material.

11. The electronically triggered locking differential of claim 10, wherein the bearing race has a pilot journal and a plurality of vertical supporting features, and wherein the bearing race has a plurality of air gaps.

12. The electronically triggered locking differential of claim 11, wherein said plurality of air gaps comprises first air gaps disposed in the pilot journal and second air gaps disposed in the vertical supporting features, wherein the first and second air gaps alternate with each other.

13. An electronically triggered locking differential comprising:
 a differential case defining an axis of rotation and a gear chamber;
 at least one pinion gear acting as an input gear and first and second side gears acting as output gears for rotation with respective axle shafts, the pinion gear and first and second side gears disposed in the gear chamber, wherein at least one of the first and second side gears has a first cam surface;
 a clutch pack operable between an engaged condition to retard rotation between the differential case and the first and second side gears and a disengaged condition;
 a cam member having a second cam surface, wherein the cam member is axially movable in response to a relative rotation between the first and second cam surfaces to engage the clutch pack;
 an engagement shaft having a first end engaged with the cam member and a second end that extends through the differential case, wherein a spur gear is disposed on the second end, and wherein rotation of at least one of said first and second side gears relative to the differential case causes rotation of the engagement shaft along a shaft axis;
 a magnetic coil operable between a de-energized condition and an energized condition, wherein the magnetic coil generates magnetic flux when in the energized condition;
 a bearing race supporting the magnetic coil;
 a flux conductor disposed on the differential case;
 a sprocket coupled to the spur gear and disposed between the differential case and the flux collector, wherein the sprocket rotates about the axis of rotation of the differential case, wherein when the magnetic coil is in the energized condition, magnetic drag slows rotation of the sprocket relative to the differential case and thereby retards rotation of the engagement shaft about the shaft axis,
 wherein retarding rotation of the engagement shaft retards rotation of the cam member relative to the side gear, causing the first and second cam surfaces to rotate relative to each other, resulting in axial movement of the cam member to engage the clutch pack and lock the differential.

14. The electronically triggered locking differential of claim 13, wherein the magnetic coil operates between the energized and de-energized condition based on an external electrical signal.

15. The electronically triggered locking differential of claim 13, wherein the sprocket is made of a magnetic material and wherein the magnetic drag occurs between the sprocket and the flux conductor.

16. The electronically triggered locking differential of claim 13, wherein the bearing race is made of a magnetic material.

17. The electronically triggered locking differential of claim 16, wherein the bearing race has a pilot journal and a plurality of vertical supporting features, and wherein the bearing race has a plurality of air gaps.

18. The electronically triggered locking differential of claim 17, wherein said plurality of air gaps comprises first air gaps disposed in the pilot journal and second air gaps disposed in the vertical supporting features, wherein the first and second air gaps alternate with each other.

\* \* \* \* \*